United States Patent [19]

Christianson

[11] Patent Number: 4,993,821
[45] Date of Patent: * Feb. 19, 1991

[54] SELF-SUPPORTED, ADJUSTABLE, CONDENSATION-FREE SHOWER MIRROR

[75] Inventor: Thomas R. Christianson, Napa, Calif.

[73] Assignee: Showertek, Inc., Napa, Calif.

[*] Notice: The portion of the term of this patent subsequent to Jun. 6, 2006 has been disclaimed.

[21] Appl. No.: 416,985

[22] Filed: Oct. 2, 1989

Related U.S. Application Data

[60] Division of Ser. No. 311,744, Feb. 17, 1989, Pat. No. 4,904,072, which is a division of Ser. No. 128,995, Dec. 4, 1987, Pat. No. 4,836,668, which is a continuation-in-part of Ser. No. 76,494, Jul. 22, 1987, abandoned, which is a continuation-in-part of Ser. No. 899,265, Aug. 22, 1986, abandoned.

[51] Int. Cl.$^5$ ............................................. G02B 7/18
[52] U.S. Cl. ........................... 350/584; 350/588; 4/597; 4/605
[58] Field of Search ............ 350/584, 588, 582; 248/466, 476, 479, 481; 4/597, 601, 605

[56] References Cited

U.S. PATENT DOCUMENTS

| | | | |
|---|---|---|---|
| 2,759,765 | 8/1956 | Pawley | 285/223 |
| 3,530,275 | 9/1970 | Rust | 350/588 |
| 3,708,218 | 1/1973 | Smillie, III | 350/588 |
| 4,150,869 | 4/1979 | Hansen | 350/588 |
| 4,556,298 | 12/1985 | Gottlieb | 350/588 |
| 4,557,003 | 12/1985 | Jones | 350/588 |
| 4,558,929 | 12/1985 | Stephens et al. | 350/588 |
| 4,733,468 | 3/1988 | Zadro | 350/588 |
| 4,836,668 | 6/1989 | Christianson | 350/588 |
| 4,904,072 | 2/1990 | Christianson | 350/607 |

FOREIGN PATENT DOCUMENTS

0032753 3/1977 Japan .................................. 350/588

Primary Examiner—Bruce Y. Arnold
Assistant Examiner—R. D. Shafer
Attorney, Agent, or Firm—David Pressman

[57] ABSTRACT

To prevent condensation on the mirror, it is heated with water from a supply tube connected from a showerhead pipe to a dispenser which disperses the heated water in either liquid or spray form, preferably from holes in a hose which is mounted in a rear temperature-control space and which surrounds the back of the mirror. The hose has an oval cross-section with holes on one of its flatter sides so that they will all face inward, toward the center of the mirror. Also the tube acts as a gasket to prevent the water from leaking through the mirror's front. The mirror is held by a flex-arm which includes breakaway flex-joints (hinge or ball), allowing rotational and translational movements. A supply tube is carried inside the flex-arm, has a friction fit in the ends of the arm, and is connected to the dispenser hose by a T-fitting. A relief slot in the mirror end of the flex-arm allows water which enters the space in the flex-arm around the supply tube to leave such space. The mirror is mounted in a frame with a back plate which is slightly larger than the frame so that the back plate spreads the back of the frame, causing its front part to be compressed, thereby to squeeze the mirror into a concave, magnifying shape.

18 Claims, 11 Drawing Sheets

SELF-SUPPORTED, ADJUSTABLE, CONDENSATION-FREE SHOWER MIRROR

RELATED APPLICATIONS

This is a Division of Application Ser. Nr. 07/311,744, Filed 1989-2-17, now U.S. Pat. No. 4,904,072, Granted 1990 Feb. 27, which is in turn a Division of Application Ser. Nr. 07/128,995, Filed 1987-12-4, now U.S. Pat. No. 4,836,668, Granted 1989-6-6, which is a Continuation-In-Part (CIP) of Application Ser. Nr. 07/076,494, filed 1987-7-22, now abandoned, which is a CIP of Application Ser. Nr. 899,265, filed 1986 Aug. 22, now abandoned.

BACKGROUND—FIELD OF THE INVENTION

Generally this invention relates to the field of anti-condensation devices for preventing the formation of steam, fog, or condensation on glass or a similar surface; specifically to a condensation-free mirror which is self supporting in a shower and is capable of being manually adjusted into different positions during use.

BACKGROUND—PRIOR ART

Some prior-art mirrors which prevent or remove steam, fog, condensation, or other vision-obscuring moisture in the shower use a blower or baffle system to pass warm air over a glass surface in order to accelerate the evaporation of any fog or steam which is formed on the surface of the glass. Such air systems are not efficient and take a relatively long period of time (minutes rather than seconds) to remove the condensation. Also the moisture usually is removed from one edge of the glass, rather than all at once.

Exhaust fans are becoming fairly standard items for bathrooms, and in some instances they are supplemented by a separate blower unit for directing heated air across the surface of a bathroom mirror, e.g., as shown in U.S. Pat. No. 4,037,079 to J. Armbruster (1977) for a bathroom mirror defogger. However users could still use a separate shower mirror since men can obtain a closer, more comfortable shave at the time their beards are softened by the steam and hot water of a shower, while women's skin treatments are best applied in a steamy environment, as well as in front of a mirror.

Resistance wires imbedded in a sheet of plexiglass have been used as an alternative to blowers, but such devices can be dangerous when used in the vicinity of water. Also, the need for electrical power to activate the resistance wires requires the use of batteries or the like.

Water-heated shower mirrors have been proposed, but these have been awkward to install, complicated and hence expensive, and unreliable in operation.

Anti-fogging mirrors have also been proposed, but these do not operate reliably and require repeated applications of chemical anti-fog coatings.

OBJECTS AND ADVANTAGES

One object of the invention is thus to overcome the disadvantages of the aforementioned prior-art mirrors and to provide a safe, efficient, and trouble-free method of removing or preventing the accumulation of steam from or on a mirror installed in a shower stall. A related object is to provide devices which are part of a permanent shower installation, as well as to provide an accessory device which can be quickly installed without the need of specialized tools in any existing shower.

A general object is to overcome the deficiencies of prior-art devices and provide a unique method of using heated water which is distributed through a suppply tube from the showerhead pipe, and by relying solely on the normal water pressure in order to pass the heated water through a temperature control space behind a shower mirror panel. A related object is to provide a method which does not require any separate auxiliary heat source for preventing the formation of fog on the mirror's surface.

An important object is to provide a mounting device for the mirror which allows the mirror to be adjustably moved away from the shower wall closer to the user, up, down, or orbitally, while still remaining suspended without any floor supports. A related specific object is to provide one version of the invention which has a single mounting arm connected directly to the showerhead pipe without any supplemental supports.

Another object is to provide a mirror which includes a space or chamber behind it to receive heated water from one or more inlets, and which allows complete discharge of such water through normal gravity flow through one or more outlets, despite the adjustable positioning of the mirror.

A further object is to provide one or more spray nozzles for directing heated water against different sections of a mirror panel to cause the water to run down the back surface of a mirror panel to facilitate the heat transfer from to the mirror. A related object is to use a spray nozzle inside a partially enclosed chamber behind the mirror panel to confine and circulate both heated liquid and heated mist in the chamber to cause the back of the mirror panel to rise in temperature to prevent condensation of water on the front surface of the mirror panel.

Yet another object is to provide a dispenser hose with a plurality of apertures along its length for partially or wholly encircling a portion of the back panel of the mirror in order to achieve more efficient dispersion of the heated water despite the position of the mirror or fluctuations in water pressure.

Still another object is to provide a single circular frame for holding a mirror panel. A related object is to provide a rear plate for holding a dispensing hose securely in position adjacent to the back of a mirror panel. A further related object is to provide a rear plate which is large enough to substantially enclose most of the temperature control space behind the mirror panel while at the same time holding the dispensing hose directly against the mirror panel. Another specific object is to allow full gravity drainage which is independent of the position of the mirror by providing periodic cutouts along the entire periphery of the rear plate.

A further object is to provide a T-junction for attachment to a showerhead pipe just above the showerhead in order to supply heated water to a temperature control space behind a shower mirror whenever heated water is turned on for the showerhead Another related object is to provide a control valve in the supply hose between the T-junction and the temperature control space to vary the rate of flow through the supply hose as well as to turn the flow through the supply hose completely off while water is coming through the showerhead onto the person in the shower. Another related object is to attach a mounting arm for the mirror directly to the T-junction.

An additional object is to provide one form of the invention having a single flex-joint on each mounting arm to allow angular position adjustment during use. A related object is to provide a preferred form of the invention having a flex-arm which allows rotational as well as translational movement through manual manipulation of the mirror. Another related object is to incorporate a flex-arm which will maintain its stability in whatever position it is placed by the user.

A further object is to simplify the construction parts of the invention by having the supply tube incorporated as part of the mounting arm. A related object is to incorporate the supply tube inside the hollow central passage of a flex-arm.

Still further objects are to provide a magnifying shower mirror in an economical manner, to provide a shower mirror with a flexible, yet more stable arm, to provide a shower mirror which can accommodate high pressure water without undesirable leakage, to provide a shower mirror which will not break in case of trauma, and to provide a supply and dispenser hose for a shower mirror which is self-aligning.

Other important objects are to take advantage of recent developments of improved materials, component parts, and manufacturing techniques, and to design a small product having a minimal number of parts which is inexpensive to manufacture, easy to install, and which does not provide a safety hazard to the user.

These and other objects will be apparent to those skilled in the art from a review of the accompanying drawings and the following detailed description.

DRAWING REFERENCE NUMERALS

| | |
|---|---|
| 12 mirror | 14 backside |
| 16 reflecting surface | 18 frame |
| 20 hinges | 22 back plate |
| 23 wall fasteners | 24 inlet tube |
| 25 T-junction | 26 diffuser bar |
| 28 brackets | 30 apertures |
| 31 mirror | 33 front face |
| 35 back surface | 37 rectangular frame |
| 39 back plate | 41 inlet |
| 43 outlet holes | 45 hinge joint |
| 47 moving bracket | 49 fixed bracket |
| 51 diffuser loop | 53 apertures |
| 72 mirror | 73 inlet |
| 74 T-fitting | 76 control valve |
| 78 showerhead | 80 shower head pipe |
| 82 hose | 84 heat exchanger |
| 86 outlet | 88 flexible tube |
| 90 support arm | 92 rotary flex-joint |
| 94 arrow | 112 showerhead |
| 114 supply pipe | 115 outlet drains |
| 117 wall bracket | 119 rigid arm |
| 121 ball joint | 123 hanger |
| 125 arrow | 127 arrow |
| 129 diffuser hose | 131 apertures |
| 133 drain holes | 138 drain |
| 140 shower enclosure | 142 full-length mirror |
| 143 back surface | 144 upper aux. supply pipe |
| 145 upper dispersion nozzle | 146 lower aux. supply pipe |
| 147 lower dispersion nozzle | 148 control valve |
| 150 hot supply pipe | 152 cold supply pipe |
| 154 outlet | 200 showerhead pipe |
| 202 showerhead | 204 T-junction |
| 206 flex-arm | 208 junction boss |
| 210 frame | 211 circular mirror |
| 212 front flange | 213 mirror |
| 214, 222 water | 216-220 arrows |
| 230 male threaded end | 232 female threaded end |
| 234 central leg | 236 seat |
| 238 ball joint | 240 seat |
| 242 supply hose | 244 splayed end |
| 250 T-intersection | 252 central leg |

| | |
|---|---|
| 254 lateral legs | 256 stop ridge |
| 258 arrow | 260 nozzle tube |
| 262 apertures | 270 back plate |
| 272 cutouts | 274 shoulders |
| 276 joint | 278 back surface |
| 280 back strip | 282 spray nozzle |
| 284 tube | 286 water |
| 288 flange | 290 apertures |
| 292 aperture | 294 slot |
| 296 ridge | |

SUMMARY

The present invention is an accessory shower mirror which can be installed in an existing shower, or alternatively is a permanent mirror which can be built into the shower. In both versions, it is preferable to have the heated water come from the same supply pipe which is connected to the shower head so that turning on the shower also turns on the heated water supply for the mirror, and turning off the shower head automatically turns off the water to the mirror. Additionally, no auxiliary pump energy is needed for the mirror water. Finally, as the temperature of the water coming out of the shower head increases, the temperature of the water supplied to the mirror increases at approximately the same rate to provide a built-in energy conservation control to avoid excessively heating the mirror beyond the minimum temperature needed to prevent steam from obscuring the mirror surface. Conversely this maximizes the device's ability to prevent condensation from forming as the shower temperature increases the ambient steam temperature.

Figure 1:
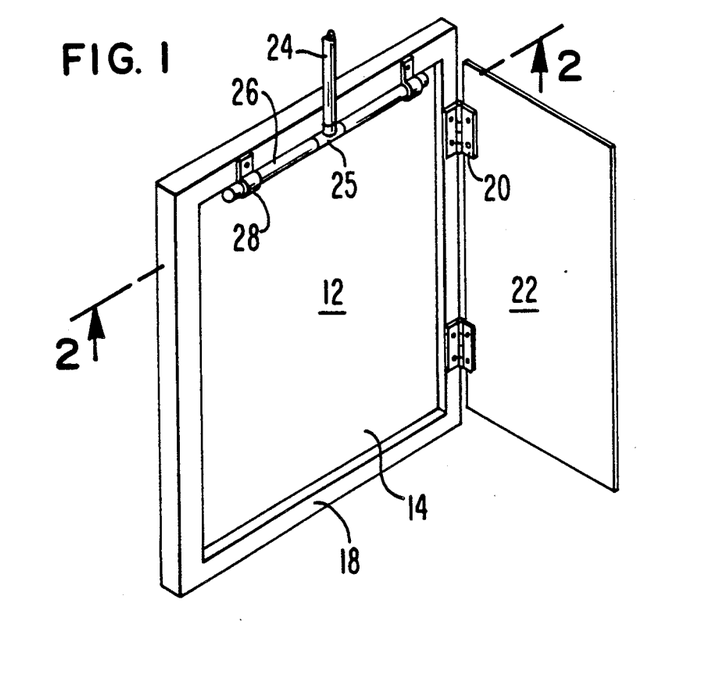
FIG. 1 is a perspective view showing an early version of the invention which is hingedly mounted on a shower wall, and has a spray-type diffuser bar mounted behind the upper edge of the mirror.
Figure 2:
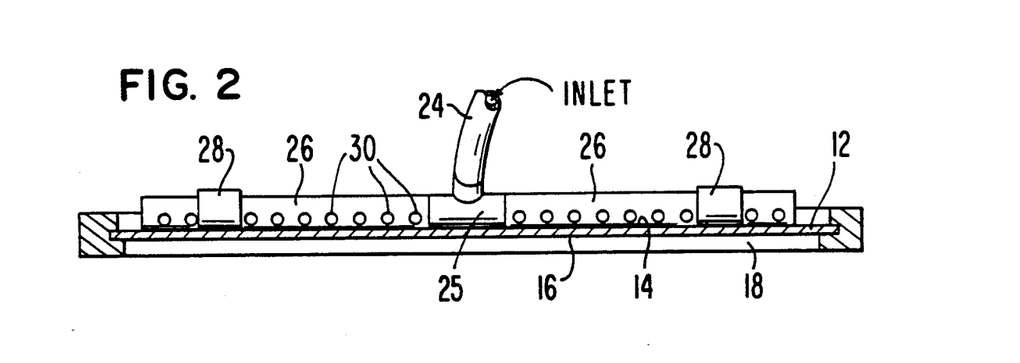
FIG. 2 is a sectional view taken along the line 2——2 in FIG. 1, looking upwardly toward the diffuser bar.
Figure 3:
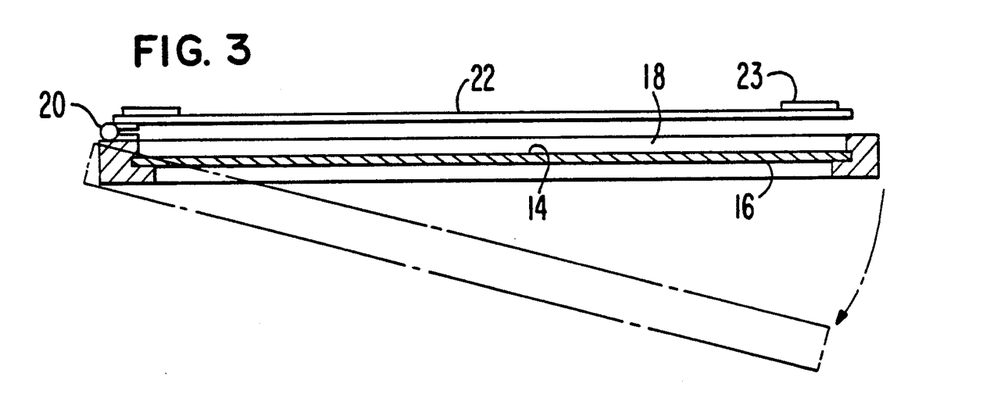
FIG. 3 is a sectional view looking downwardly on the version of FIG. 1, with the mirror in closed position against the wall.

FIGS. 1—3

FIGS. 1-3 show an exemplary embodiment of the invention. An acrylic mirror 12 has a back side 14 and front reflecting surface 16 which is carried within a frame 18. The frame is designed so that its back side 14 is spaced away from the shower wall during use, thus providing a temperature control space behind the mirror. In some instances, it is desirable to partially enclose the temperature control space in order to provide a more efficient heat transfer chamber, but experimental prototypes provided dispersion of the heated water against the back side without having to employ the more sophisticated construction needed for completely enclosed temperature control chambers. Also, excessive water pressure that occurs as the enclosed chamber is filled may result in failure of the seals and/or splitting of the material.

In order to mount the unit on a shower wall so as to provide adjustable positioning of the mirror during use, hinges 20 connect frame 18 to a back plate 22 which has wall fasteners 23 (FIG. 3) for attachment to a shower wall. The use of a flexible joint (flex-joint), such as hinges or the like, provides the capability of manually bringing the mirror closer to the user so as to provide an enlarged image as well as ease of angular adjustment to facilitate different positioning for different-size persons within the shower stall, as well as to provide close-up Viewing when necessary The material used for the mirror is not limited to acrylic, but other materials, such as polished chrome, safety glass, and the like can also be used. However, I found that a mirror having a relatively thin dimension, such as ⅛ inch, provided quicker transfer to heat from the temperature control chamber through the back side of the mirror to the front side of the mirror An acrylic mirror of ¼ inch does work, but it takes a longer time to eliminate steam which may have already formed on the front surface of the mirror.

In order to increase the temperature of the mirror sufficiently to prevent condensation from forming on its viewing or front surface, heated water is distributed through an inlet tube 24, through a T-junction 25, to a diffuser bar 26 which extends along the top of the mirror along its back side 14, substantially the full width of the mirror. Brackets 28 hold diffuser bar 26 to frame 18 so that a plurality of apertures 30 face back side 14 to direct heated water against the back of the mirror where it runs down the mirror to its bottom edge. This unit can be mounted at any appropriate height and the hinged construction allows angular adjustment without interfering with the dispersion of heated water in the temperature control space. In that regard, the mirror frame and diffuser bar all move together as a single composite unit.

The invention is not limited to the right/left hinged construction shown. On the contrary, various adjustable mounting devices, such as tracks, slides, ball joints, scissor mounts, pivots, and the like can be used in order to achieve different combinations of vertical, horizontal, back-to-front, and/or angular adjustments of the mirror relative to a viewer.

Figure 4:
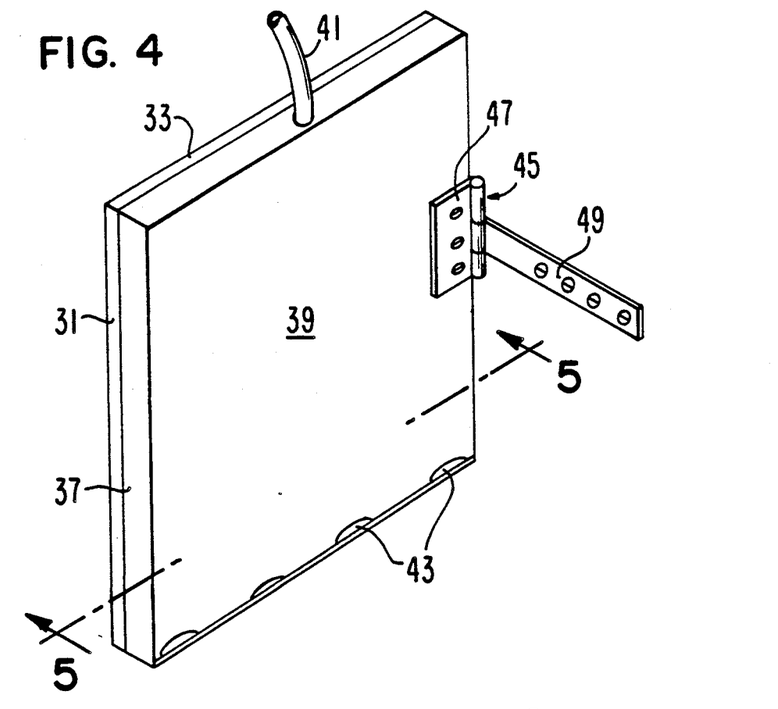
FIG. 4 is a perspective view of another version of the invention which is hingedly mounted through a single flex-joint to a shower wall, and has a partially enclosed temperature control compartment fed from a top inlet pipe and drained through bottom gravity flow holes.

FIG. 4

One variation of the invention using a partially enclosed chamber is shown in the embodiment of FIG. 4 which incorporates a single flex-joint in order to achieve the necessary manual adjustability feature during use. A mirror 31 is mounted on the front of a rectangular frame 37 with a front face 33 facing away from the wall and a back surface 35 Which, along with the frame, forms a heat transfer chamber. A back plate 39 is attached by suitable means to the frame to partially enclose the chamber, so that heated water passes through an inlet 41 into the chamber and is discharged from the chamber through gravity flow outlet holes 43 which are cut out from the bottom perimeter of the back plate A synthetic hinge joint 45 serves as the flex-joint and is connected to the mirror unit through a moving bracket 47 attached to back plate 39 and is connected to the shower wall through a fixed bracket 49 which may be elongated for assuring secure fastening to the wall.

Figure 5:
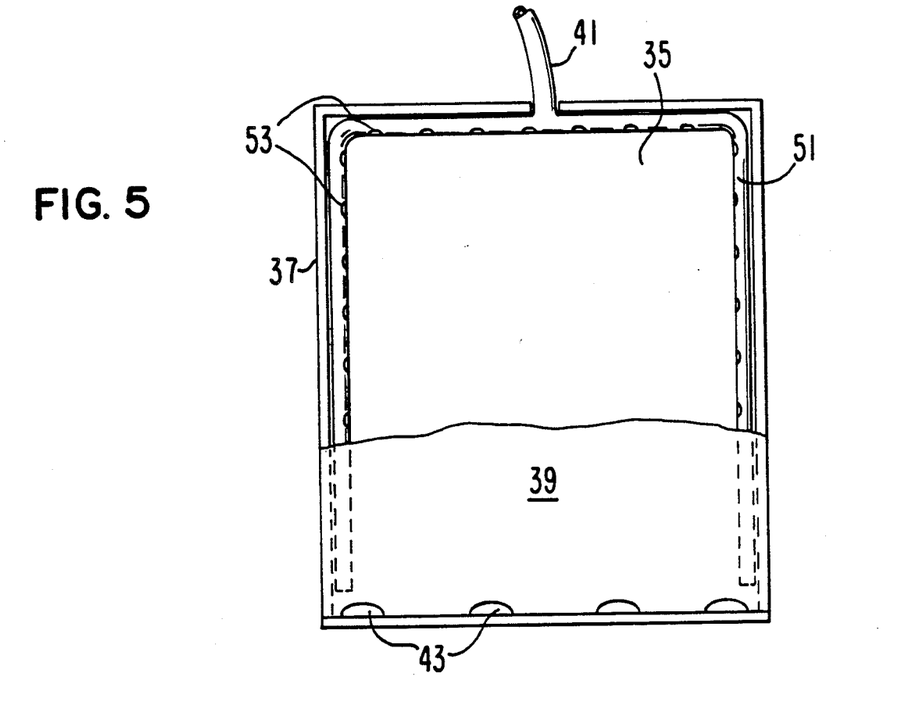
FIG. 5 is a partial sectional view taken along the line 5——5 in FIG. 4.

FIG. 5

Where one desires continuously to drain the water from the heat transfer chamber before it accumulates to any significant degree, it was found that more efficient heat transfer was accomplished by providing a plurality of nozzle outlets spaced apart throughout the length and breadth of back surface 35. In this embodiment, as best shown in FIG. 5, a U-shaped diffuser loop 51 having a plurality of apertures 53 distributes the heated water throughout the heat transfer chamber. Thus it is not necessary for all of the heated water to be introduced at the top of the heat transfer chamber in order to achieve the desired dispersion of heated water on the back of the mirror and throughout the chamber.

Figure 6:
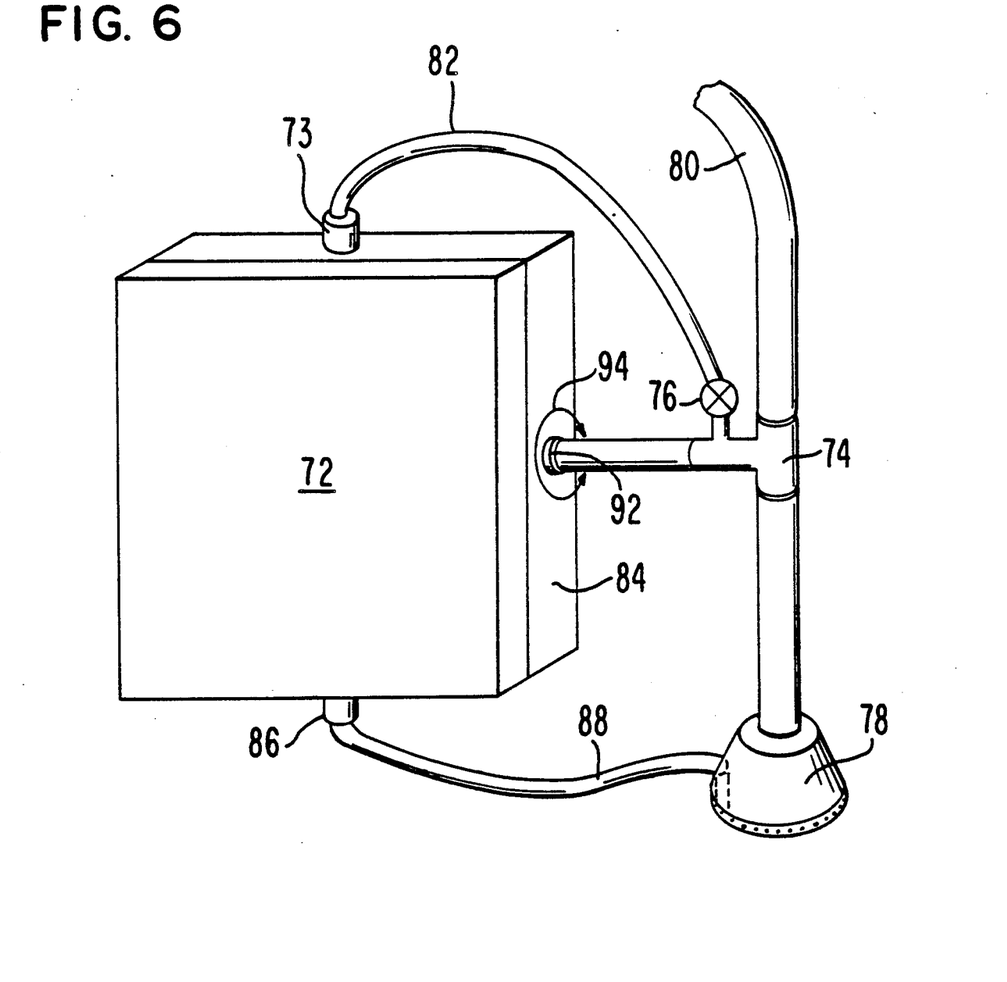
FIG. 6 is a perspective view of a different version of the invention which is rotatably mounted on a support arm connected to the showerhead pipe and which has a separate supply hose from the showerhead pipe.

FIG. 6

As shown in FIG. 6, direct mounting to the showerhead pipe as well as complete conservation of the water can be accomplished with a standard accessory unit which is usable with different forms of heat exchanger units. More specifically, the temperature of a mirror 72 is controlled by heated water supplied through an inlet 73 from a T-fitting 74 which has a control valve 76 (on/off or variable flow). Water coming to a shower head 78 from a shower head pipe 80 passes along a flexible hose 82 through a dispensing nozzle (not shown) into a heat exchanger unit 84 to allow transfer of heat, either directly or indirectly, from the water to mirror 72. The water is then routed through outlet 86 and then back through a flexible tube 88 to shower head 78 for distribution into the shower stall along with the rest of the shower water.

Mirror 72 is held in suspended position by a support arm 90 which connects at one end to T-fitting 74 and at the other end through a rotary flex-joint 92 which allows the mirror to be manually adjusted about a horizontal axis (as shown by arrow 94) during use without interfering with the flow of water to and from heat exchanger unit 84 behind mirror 72.

Thus readers will understand that various forms of mounting arms can be used in conjunction with various types of heat transfer methods and devices behind a shower mirror in order to facilitate the efficient and immediate transfer of heat energy from the heated water to the shower mirror, and without interfering with the manual adjustability of the mirror position, all within the spirit and scope of the present invention. Also, by leaving the front of the mirror free of any protruding devices, it is possible manually to wipe off any shower droplets which may be inadvertently splattered onto the surface of the mirror.

Figure 7:
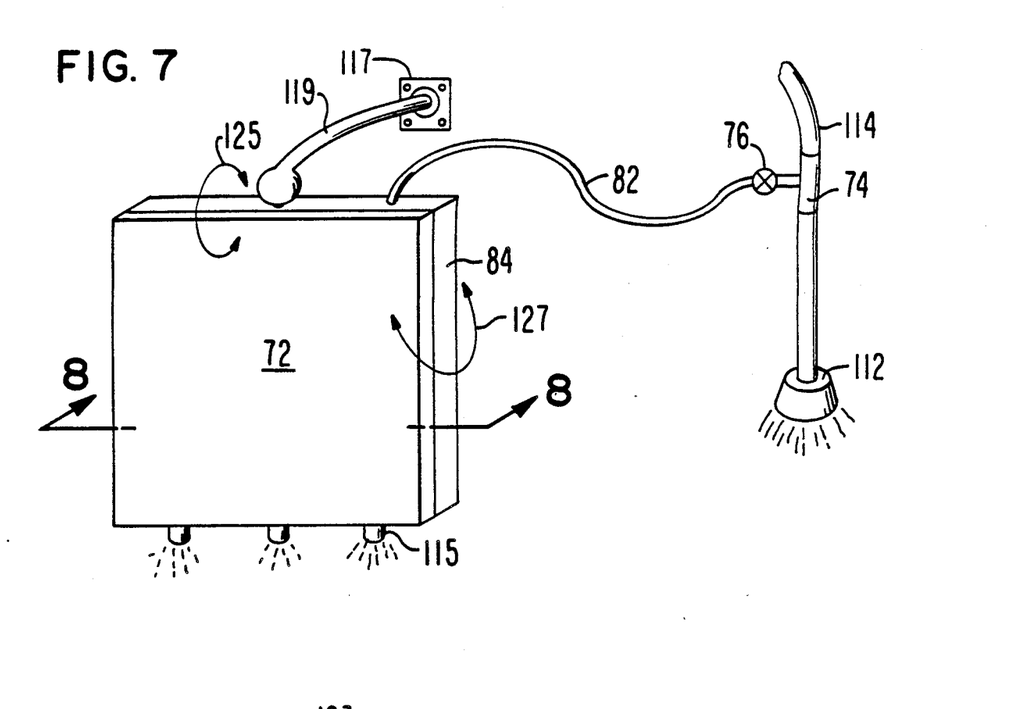
FIG. 7 is an additional version of the invention which is rotatably mounted on a support arm connected to the shower wall and which has a diffuser hose extending around the entire periphery of the mirror.
Figure 8:
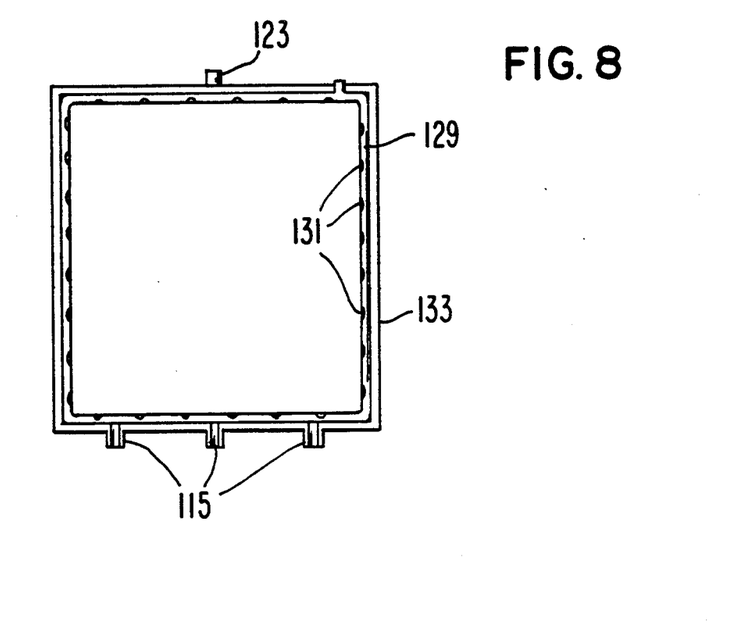
FIG. 8 is a sectional view taken along the line 8——8 in FIG. 7.

FIGS. 7-8

In some instances it is advisable to avoid having excessive weight on the showerhead pipe while at the same time having the wide range of adjustability which results from having the mirror mounted in a position displaced a substantial distance away from the shower wall. Thus to provide a relatively permanent installation without limiting adjustability, the embodiment of FIGS. 7-8 includes a conventional showerhead 112 which is supplied through supply pipe 114. A conventional T-fitting 74 provides water directly from the supply pipe through a valve 76, as previously described, to deliver heated water through flexible hose 82 to heat exchanger unit 84 behind mirror 72. Outlet drains 115 at the bottom of the heat exchanger unit allow gravity discharge of the water.

In this version, a permanently installed wall bracket 117 carries a rigid arm 119 which connects through a ball joint 121 to a hanger 123 which is attached to the heat exchanger unit behind the mirror. Such an installation places the mirror substantially away from the shower wall and thereby allows manual manipulation of the mirror in directions around an imaginary horizontal axis, as shown by arrow 125, and also in directions around an imaginary vertical axis, as shown by arrow 127.

In order to assure thorough dispersion of the heated water behind the mirror in the heat exchanger, a complete-loop diffuser hose 129 extends around the entire perimeter of the back of the mirror and includes inwardly directed apertures 131 periodically spaced along the hose. To avoid any undue accumulation of water buildup, additional drainage or ventilation holes 133 may be provided.

Figure 9:
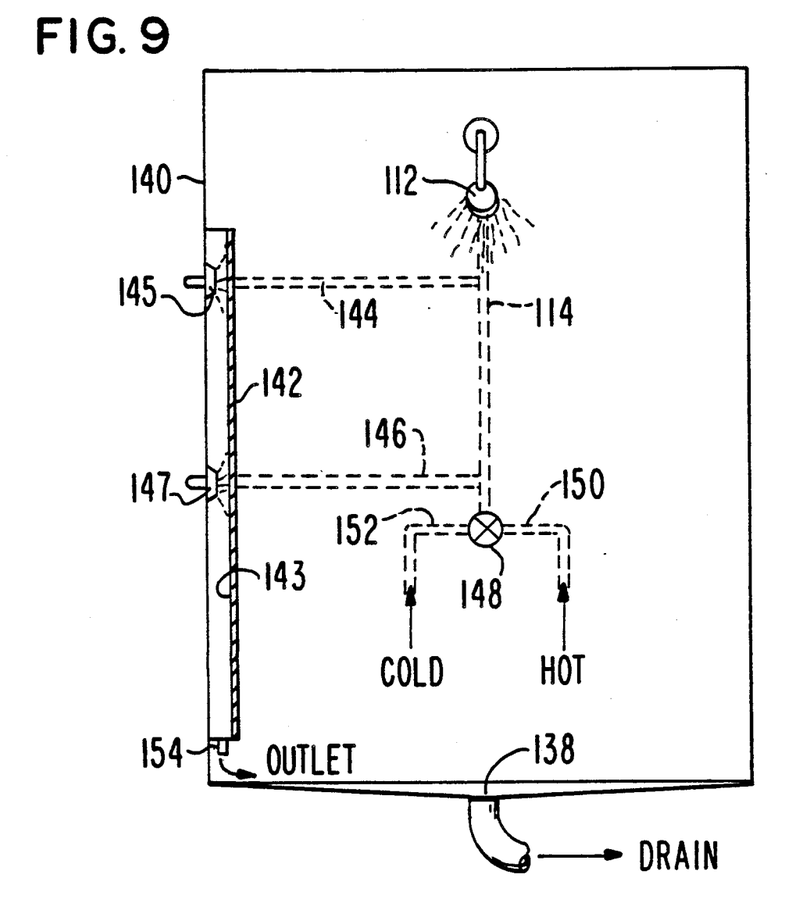
FIG. 9 is a schematic drawing showing a modular unit having a full length mirror with a temperature control compartment fed by multiple spray-type dispersion nozzles and drained through a gravity flow outlet.

FIG. 9

The permanently installed version of FIG. 9 shows an embodiment which features a full-length mirror without having the strain problems of a completely-enclosed, water-filled heat transfer chamber. More specifically, a modified shower enclosure 140 carries a full-length mirror 142 mounted on the back shower wall so that back surface 143 of the mirror receives heated water sprayed directly against such back surface from upper and lower dispersion nozzles 145 and 147, which are respectively supplied by upper and lower auxiliary supply pipes 144 and 146, connected to main supply pipe 114. In this simplified piping system, the correct mix of hot and cold water from supply pages 150 and 152 is provided by control valve 148. The heat transfer chamber fills with hot water and spray or mist from the two nozzles so that the mirror is heated directly by the water streaming down its back side, as well as indirectly by the ambient air, mist, and spray mixture in the heat transfer compartment. The residual water is fully discharged by gravity flow through outlet 154 onto the shower floor for ultimate disposal down drain 138.

Whether the features of the invention are embodied in an accessory version or as part of a permanent shower installation, the unique method is applicable to both. Heated water is transferred from a showerhead supply pipe to an inlet for a heat transfer chamber directly behind a mirror. The water is then dispersed throughout the chamber by one or more spray nozzles in order to transfer its heat through the back side of the mirror to the reflective front face of the mirror. Residual water is completely and continuously discharged from the chamber through one or more gravity flow outlets. Where the mirror is not full length, adjustable means, such as a flex-joint, enables rotation and/or positioning of the mirror without interference with the flow of heated water through the heat exchanger unit. Such adjustability has been achieved with even greater facility and simplicity by incorporating the heated water supply hose as part of a flex-arm which is suspended directly from the showerhead pipe, all as described in detail hereinafter with respect to the preferred embodiment which has been recently developed.

Figure 10:
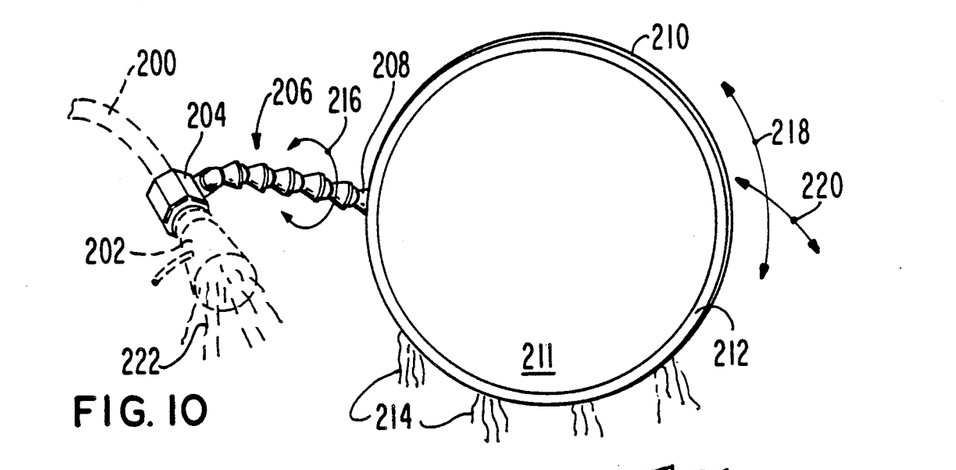
FIG. 10 is a perspective view of a presently preferred embodiment of the invention mounted on a showerhead pipe.

FIG. 10

As shown in FIG. 10, the invention is adaptable for installation directly on a conventional showerhead pipe 200 at a point above showerhead 202. In that regard, a T-junction 204 allows some of the showerhead water to be diverted through a flex-arm 206 to a temperature control space behind a circular mirror 211. A junction boss 208 interconnects flex-arm 206 to a frame 210 which has a front flange 212 which overlies the front edge of the mirror and thus holds mirror 211 securely in place. Water 214 is drained by gravity flow from the temperature control space.

A wide range of positions are possible with this circular embodiment. For example, flex-arm 206 permits rotary movement, as shown by arrow 216, as well as vertical movement, as shown by arrow 218, and horizontal movement, as shown by arrow 220. All of these manual manipulations can be accomplished during use while the showerhead is dispensing water 222, and since the showerhead pipe supplies the heated water to the temperature control space at the same time, the mirror is kept condensation free despite its orientation. During non-use, the mirror can be rotated to face the wall, thereby avoiding the buildup of soapy water stains and the like.

It is possible to make new shower installations with the circular condensation-free mirror permanently installed, or alternatively it can be installed as an accessory to an old shower. There is no horizontal or vertical space requirement, so that it can be installed wherever space allows, whether it is on the right, the left, or above or below the showerhead, in a combination tub and shower or a shower stall.

Figures 11, 12:
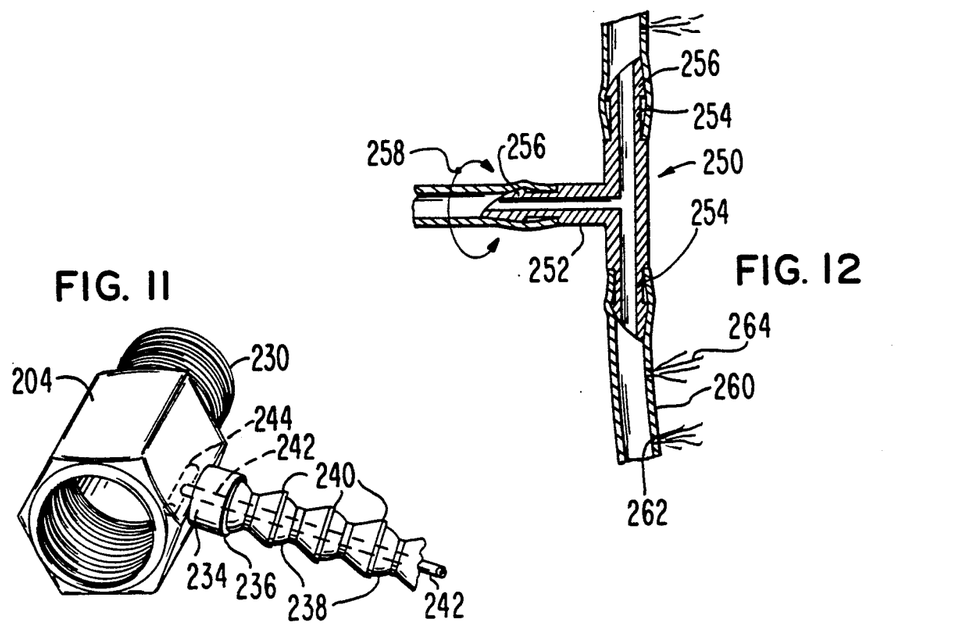
FIG. 11 is a close-up perspective view of a portion of the embodiment of FIG. 10 showing an end of the flex-arm connected to a T-junction designed for attachment to a showerhead pipe.
FIG. 12 is a close-up sectional view of a portion of the embodiment of FIG. 10 showing the intersection of the supply hose with a nozzle tube in the temperature control chamber.

FIG. 11

Although it is possible to use standard T-junction hardware to make the connection with the showerhead pipe, in the preferred form a customized T-junction 204 is used (FIG. 11). It includes the usual male-threaded end 230 and female-threaded end 232, but has a modified central leg 234 which has an enlarged seat 236 for journaling a ball joint 238 of an adjacent link in the flex-arm. The opposite end of each link forms a similar enlarged seat 240 for receiving the next ball joint of the next link, and so forth, all the way up the flex-arm. While the invention is not limited to the flex-arm shown, it was found that such a flex-arm (sold under the trademark LOC-LINE by Lockwood Products, Inc., Lake Oswego, OR) provided both pivotal movement of each link in any lateral direction relative to the adjacent link, as well as rotary movement of each link relative to the adjacent link, thereby enabling the mirror to be pivoted for adjustment of angular orientation in the vertical and horizontal directions. Translational movement of the mirror can also be achieved without changing the angular orientation, thus enabling the mirror to be moved back and forth, up and down, and from right to left. The friction engagement between adjacent links assures that the flex-arm and the mirror attached thereto will remain in position until it becomes necessary to manually manipulate it to a new position. This is achieved without any additional support arms from the floor of wall or ceiling of the shower enclosure, thus making the mirror self supporting in a suspended position above the floor.

Moreover, the central passage in the flex-arm can supply water from the showerhead pipe to the chamber behind the mirror. In the illustrated form, a separate supply hose 242 is inserted through the passage in order to carry water from T-joint 204 through flex-arm 206 to a nozzle unit in the control space. One advantage of a separate supply hose 242 is that if the adjacent links of the flex-arm are pulled apart, the mirror will not fall to the floor since it is still supported by the supply hose. In order to achieve this additional benefit, the end of supply hose 242 in T-joint 204 is held there such as by a tight friction fit, or alternatively by a splayed end, such as 244, which can't be pulled through the central passage in the flex-arm.

FIG. 12 [Al:ChrisCls.CIP]

The other end of supply hose 242 is interconnected through a T-intersection 250 (FIG. 12) which has a central leg 252 and two opposite lateral legs 254. Each leg has a one-way stop ridge 256 to hold any hose or tube in position for communication with the hollow axis of the T-intersection. This junction allows rotation of the supply hose relative to the T-intersection, as shown by arrow 258, without having the hose become disengaged from the T-intersection. This is important so that water flow continues uninterrupted when the mirror is rotated around the axis of the flex-arm, as previously described. A nozzle tube 260 is connected between lateral legs 254 and has apertures 262 for directing water into the temperature control space and against the back of mirror 211.

For manufacturing purposes, I prefer to use the flex-arm of FIG. 11 with ball joints 238 facing toward T-joint 204. This enables the composite component of FIG. 15 to be molded of less expensive plastic since its seats 236 and 240 which require a higher quality, expensive plastic for achieving proper ball joint linkage.

Figure 13:
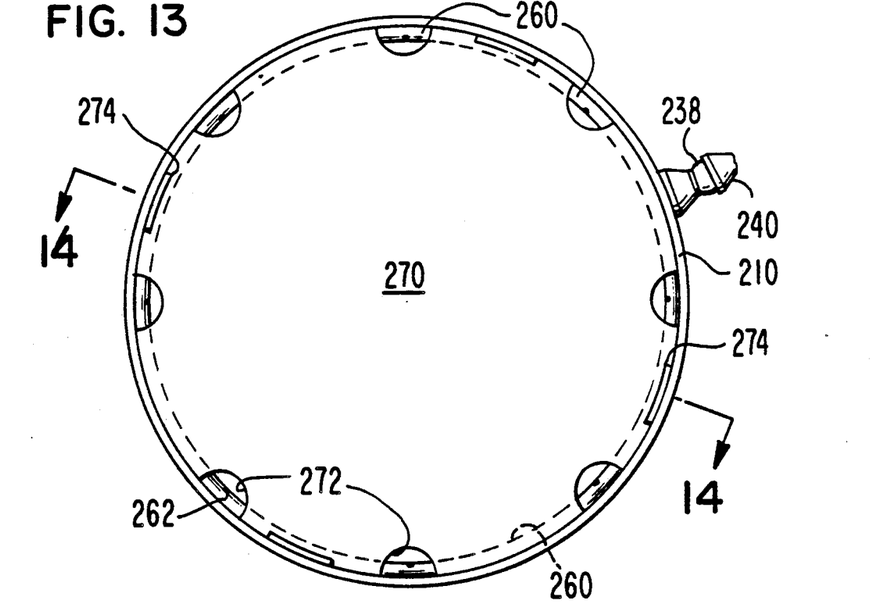
FIG. 13 is a rear view of one version of the embodiment of FIG. 10 showing a back plate in position inside a frame against a nozzle tube loop.

FIG. 13

Although there are a number of different ways for partially enclosing the temperature control chamber in order to make the heat transfer from the heated water to the front face of the mirror more efficient, the illustrated embodiment includes a back plate 270 (FIG. 13) which fits inside the back of frame 210. Periodic cutouts 272 around the perimeter of back plate 270 provide drain holes capable of discharging water from the temperature control chamber, notwithstanding the orientation of the mirror during use. In other words, whatever change in position is made, there will almost always be a downwardly located drain hole for preventing excessive accumulation of water. If the water does begin to build up in the chamber, the rest of the drain holes will provide additional discharge paths.

Figure 14:
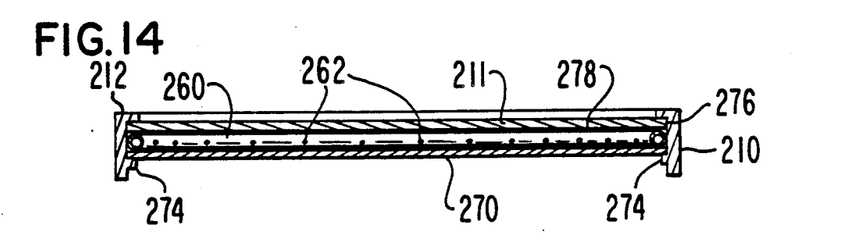
FIG. 14 is a sectional view taken along the line 14—14 in FIG. 13.

FIG. 14

In order to hold back plate 270 in position, the frame includes shoulders 274 which extend inwardly from the frame. Thus the back plate is slightly flexed to fit inside the frame forward of the shoulders, such that when the back plate returns to its normally flat shape, the shoulders hold it against nozzle tube 260 (FIG. 14). This has the additional advantage of causing the nozzle tube to serve as a gasket, preventing the leakage of water through joint 276 out to the front surface of the mirror This eliminates the need of any sealing, caulking, or bonding adhesive. In other words, even though the heated water in the chamber is circulated for direct contact against back surface 278 of the mirror, back plate 270 provides adequate restraint against the nozzle tube and the mirror thereunder to hold them in secure position against front flange 212 of the frame. By making the diameter of the loop of nozzle tube 260 slightly less than the inside diameter of the frame, and by making the nozzle tube of slightly resilient material, the nozzle tube will be slightly compressed by the pressure of the back plate, thus creating the gasket-like function without adding any additional parts or materials.

In order to assure that apertures 262 provide free flow of the heated water into the temperature control chamber, such apertures are preferably made by a laser beam, rather than by mechanical punching. It is believed that holes of approximately 15 mils in diameter made by laser beam technology eliminate any hose material residue which might otherwise clog the apertures. Even if their direction is not toward the back of the mirror, the water will be deflected by the back plate to mix with air and/or rebound onto the back surface of the mirror and thereby achieve the heat transfer to the mirror panel, which is the primary purpose of the device.

Figure 15:
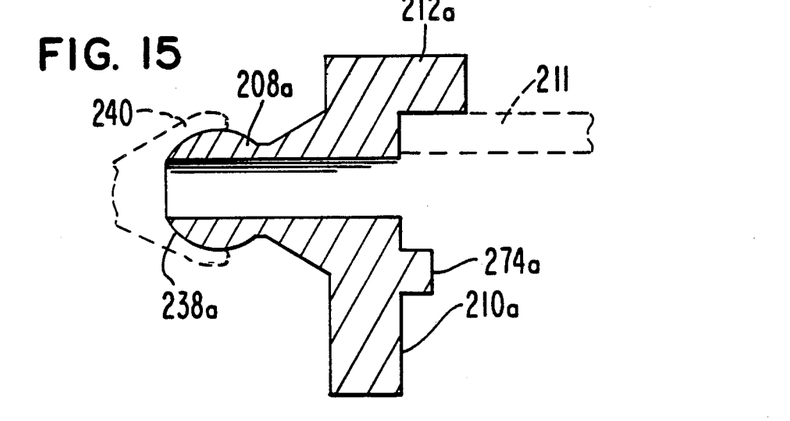
FIG. 15 is a sectional view of a modified version of the frame of FIG. 14 wherein a single unitary product component is formed to include the front flange for holding the mirror and to include a junction boss for engaging the flex-arm.

FIG. 15

The simplicity of the invention allows the use of plastic products made by the injection molded process; this assures high quality products with a minimal number of parts. Thus, as shown in the sectional view of FIG. 15, it is possible and desirable to make flange 212a, junction boss 208a, shoulder 274a, and frame 210a as a single unitary component. In this version, shoulder 274a may be formed as a continuous strip all the way around the inside wall of the frame, rather than merely as separate shoulders, as shown in FIG. 13.

Although not required, I prefer to use shatterproof non-distorting acrylic material for the mirror, and to use engineering grade acetal copolymer for the frame, T-joint, and flex-arm in order to assure the safety and non-corrosion of the device during long periods of exposure to water.

Figure 16:
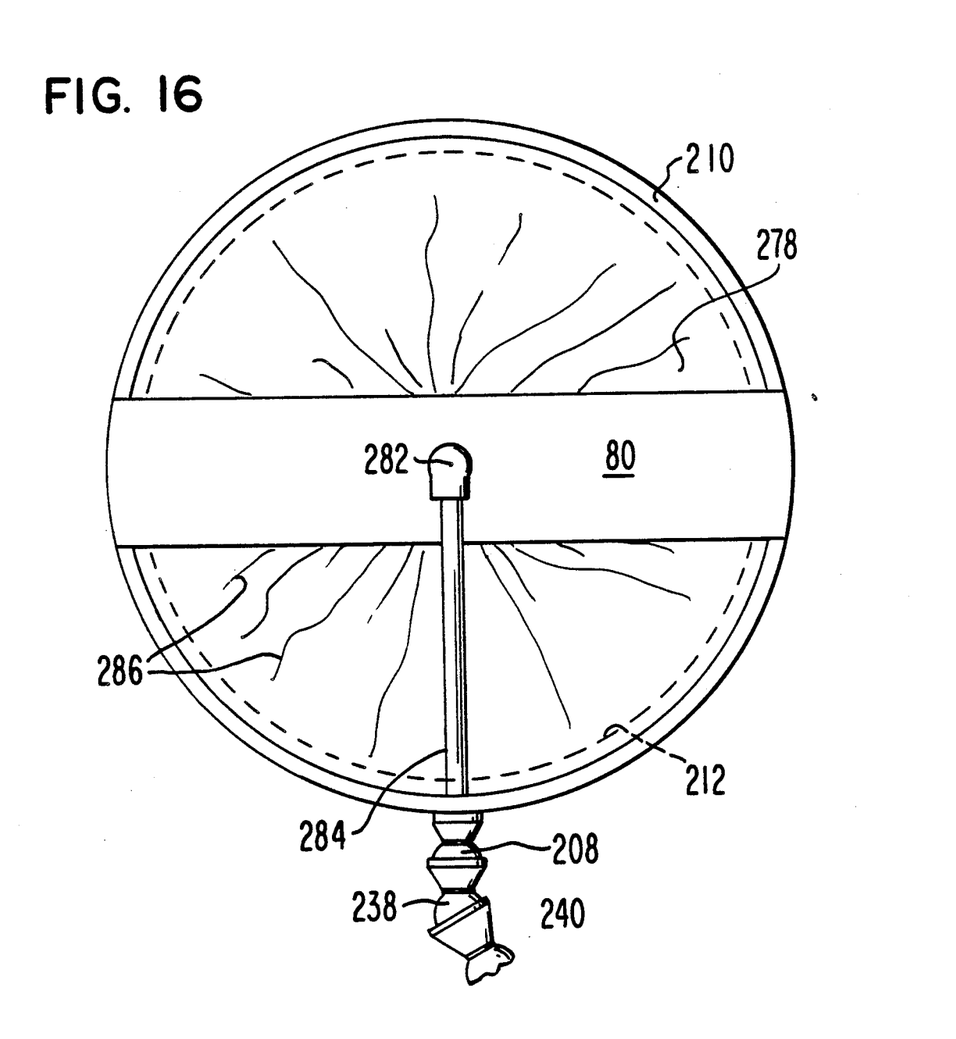
FIG. 16 is a rear view of a different version of the embodiment of FIG. 10 showing a centrally located nozzle attached to an abbreviated back plate on the rear of a frame.

FIG. 16

Where a simpler, less expensive device is desired, the construction features of FIG. 16 can be employed. An abbreviated back strip 280 is attached on the back of frame 210 with a centrally located hole for receiving a spray nozzle 282 which is supplied with heated water through a tube 284 which communicates with the supply hose (not shown) in the flex-arm. In this embodiment, water 286 sprays radially outwardly to contact the back of the mirror directly and drain out through the open back of the heat transfer compartment.

FIG. 17

As shown in FIG. 17, parts A to F, making the back plate slightly larger than the frame provides a very desirable effect is provided, as will now be described.

Figure 17A:
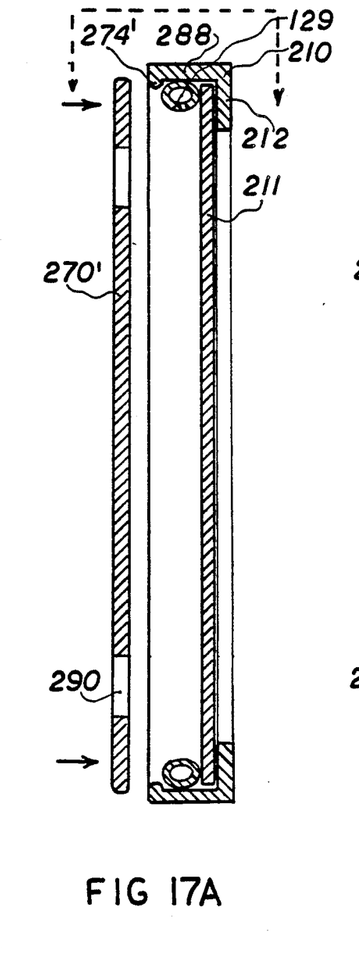
FIG. 17 (parts A to F) are cross-sectional views of a round mirror with a back plate in progressive stages of installation with enlarged views which makes the mirror magnifying.
Figure 17B:
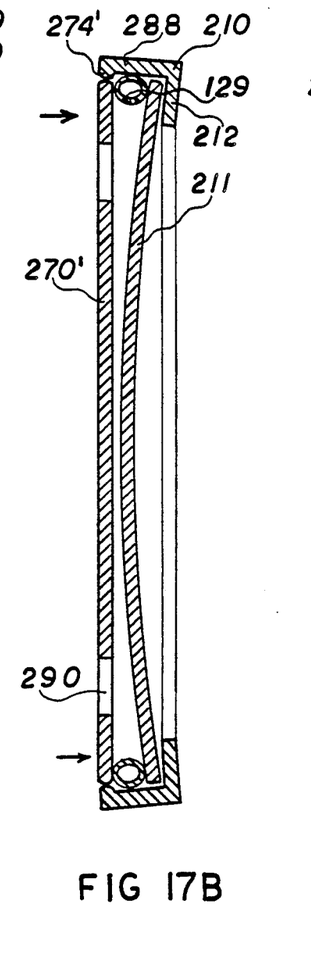
Figure 17C:
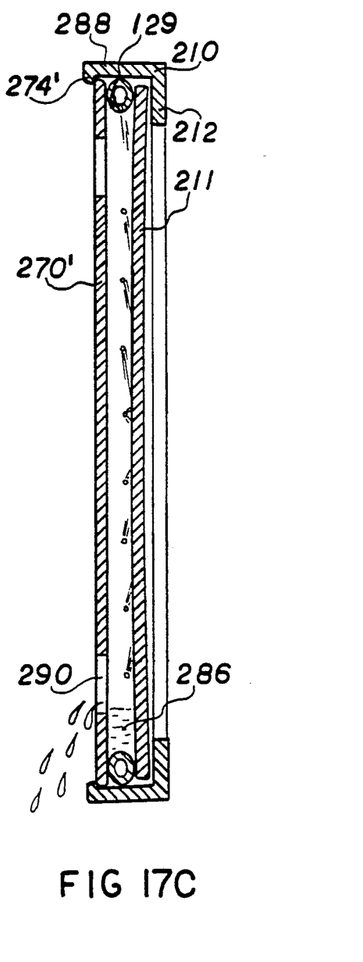
Figure 17D:
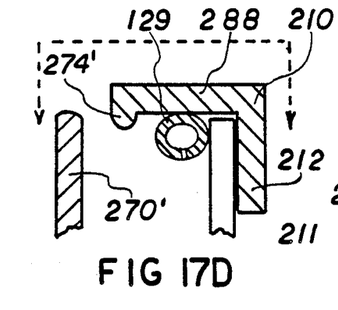

The first view of FIG. 17A and the corresponding enlarged fragmentary view of FIG. 17D show the parts in assembled position, except for back plate 270' which is about to be assembled into frame 210. Back plate 270' is slightly larger than the inner diameter of flange 288 of frame 210. Mirror 211 is in position behind front flange 212 and diffuser hose 129' overlies the back peripheral edge of the mirror, under a modified shoulder 274' which projects slightly inwardly from flange 288 and has a rounded profile. Hose 129 has an oval shape, with its direction of elongation perpendicular to mirror 211, as indicated, for purposes described in connection with FIG. 18. Back plate 270' has apertures 290 spaced around its periphery to drain water from the plenum or space behind the mirror and in front of the back plate, regardless of the orientation of the mirror.

Figure 17E:
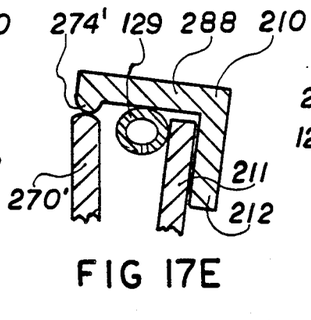

When the back plate is pushed into position, as indicated by the arrows, it passes shoulder 274', as shown in FIGS. 17B and 17E, thereby splaying or spreading the back of flange 288 out as illustrated. This movement preferably is done with the front of the assembly face down on a work surface and a suitable jig to hold and push back plate 270' down. The spreading of the back edge of the flange will force the front edge thereof, including front flange 212, inwardly This will exert a radial compression force on mirror 211, causing it to bow backwardly, as indicated in FIG. 17B, and thereby become concave, when seen from its front. In this shape mirror 211 will become a magnifying mirror.

Figure 17F:
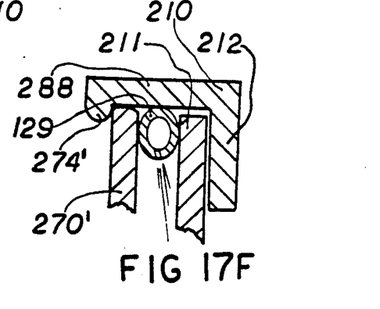

When back plate 270' is pushed home and completely seated in front of shoulder 274', as indicated in the final views of FIGS. 17C and 17F, it will compress hose 129 slightly, causing it to assume an oval shape with the long dimension of the oval parallel to the mirror, as indicated. In this position hose 129 serves as a gasket between the back plate, the mirror, and flange 288 so that water 286 (FIG. 17C) will not leak out, except via holes 290. Also, since back plate is slightly larger than the inner diameter of frame flange 288, it will hold this flange slightly spread, even in final position, whereby mirror 211 will remain slightly concave and thus will magnify when the shower mirror is assembled. Thus back plate 270' forces an ordinary, relatively inexpensive flat mirror to have a magnifying mirror shape.

FIG. 18

Figures 18A, 18B, 19A, 19B:
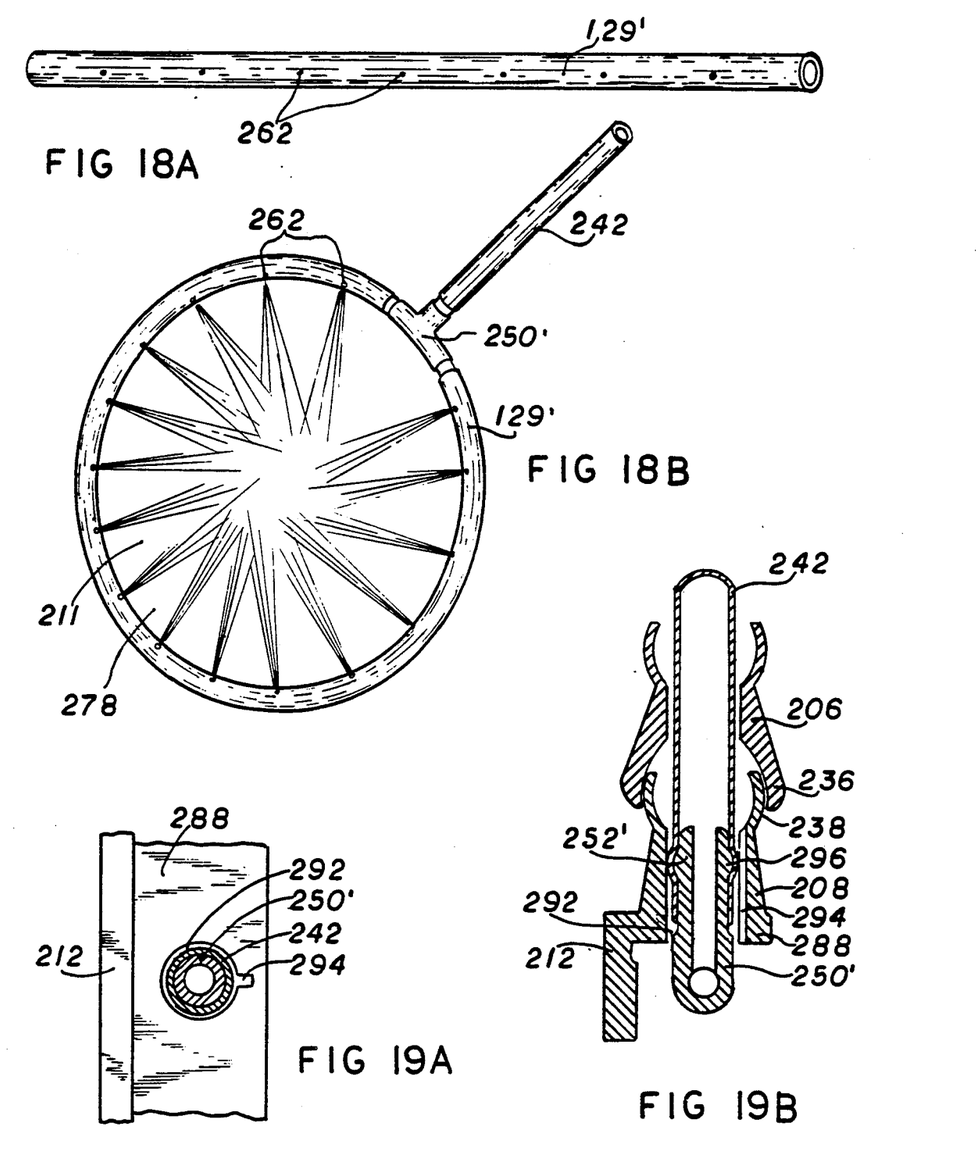
FIG. 18 (parts A and B) are views of a water supply and dispenser hose used in such mirror.
FIG. 19 (parts A and B) are side and sectional views of the inlet part of the frame of such mirror.

As shown in FIG. 18, hose 129' preferably has an oval shape in its initial, unbent, or straight shape, as indicated in FIG. 18A. In one commercial embodiment, hose 129' was made of rubber and had outer dimensions of about 7 mm × 5 mm. Apertures 262, about 0.8 to 1 mm in diameter, were formed with a laser beam in the "flat" or major surface of hose 129' about 3–4 cm apart. By virtue of the oval shape of the hose and the formation of the apertures therein on its flat side, when the hose is coiled into a circular shape and fitted onto the ends of T-intersection 250', apertures 262 will always point to the center of the circle. This is because it will be far easier to bend hose 129' so that the flat surface of the hose bends toward itself. Thus water 286 will spray toward the center of back surface 278 of mirror 211 when the hose is in final position. T-intersection 250' is similar to intersection 250 of FIG. 12, but has straight sides with circumferential ridges (FIG. 19B) which engage the hose by friction fit, rather than the barblike, shouldered shape shown in FIG. 12. FIG. 18B also illustrates how supply hose 242 is connected to the third leg of T-intersection 250'.

FIG. 19

FIGS. 19A and 19B illustrate details of the junction of flex-arm 206 with flange 288. FIG. 19A is a view taken from the inside of the plenum or heat exchange chamber toward and into the flex-arm. An aperture 292 is provided in flange 288, within boss 208 (FIG. 10). T-intersection 250' is in the center of aperture 292 and is surrounded by hose 242. As shown in FIG. 19B, T-intersection 250' has a central leg 252' with a ridge 296 which expands hose 242 so that it makes a tight, friction fit with the lumen of boss 208. Thus if flex-arm 206 separates due to trauma, this friction fit joint, and a corresponding one in seat 236 of T-junction 204 (FIG. 20B) will tend to hold the parts together so that they won't fall on the shower floor. Further the friction fit joints will serve as a gasket to help keep water out of the space in the flex arm around the hose.

In accordance with another aspect of the invention, flange 288 has a relief slot 294 adjacent and communicating with aperture 292. This slot is about 0.8 mm in width and about 2 mm long. As shown in the sectional view of FIG. 19B, slot 292 is adjacent aperture 292 and it extends for the entire length of boss 208 and communicates with the interior of flex-arm 206. Flex-arm 206 includes a seat 236 and a ball joint 238 which fits into seat 236 and is an extension of boss 208, which itself extends from flange 288. A supply leg 252' of T-intersection 250' is positioned in aperture 292 and contains ridge 296 which, as stated, expands the end of supply hose 242.

If the water pressure supplied to the shower head is very high, it will force itself past the seal between hose 242 and the interior of seat 236 (FIG. 20B) and into the annular space around hose 242, in addition to its normal path through the lumen of hose 242. Slot 294 provides a relief outlet for any water that enters this annular space, thereby conducting such water out of the annular space to the plenum or heat exchange space behind the mirror. Absent slot 294, the water in the space around hose 242 might leave through the junctions in the flex-arm, spraying to undesirable locations.

FIG. 20

Figures 20A, 20B:
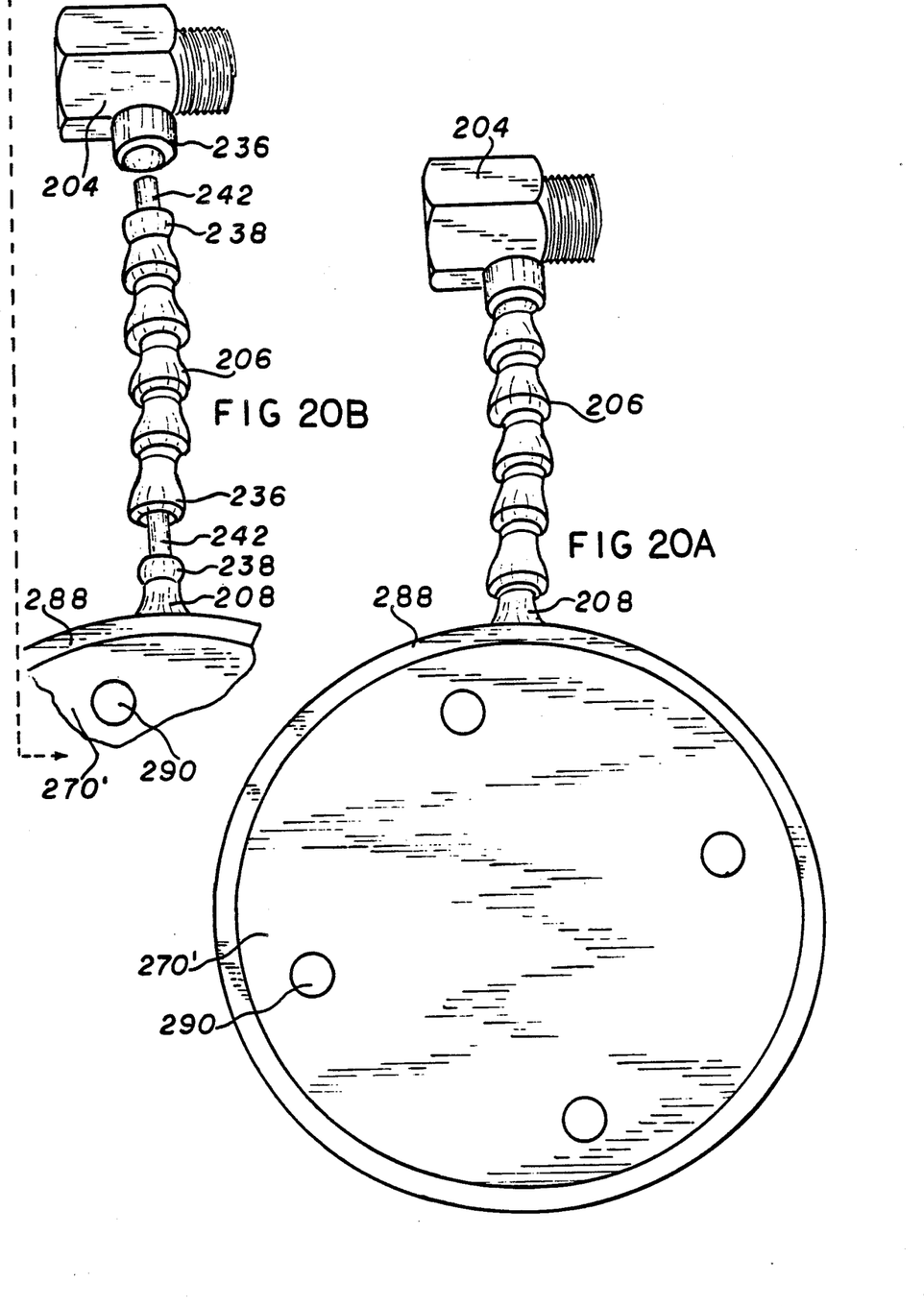
FIG. 20 (parts A and B) are perspective views of the overall mirror in partially assembled and disassembled form.

FIG. 20 (parts A and B) illustrate more detail of flex-arm 206 and how its ball and socket features which enable it to separate in case of trauma. FIG. 20A shows the entire shower mirror in assembled position as seen from the rear. Flex-arm 206 connects T-junction 204 to the circular mirror and can be bent or adjusted to any desired position or angular orientation, as stated. In case of trauma, e.g., if a person showering and shaving hits the mirror with his arm, the assembly will not be damaged, but instead will separate, either at the junction of the flex-arm T-junction 204, or with boss 208 on the mirror's flange, as indicated in FIG. 20B. In either case, a seat 236 will separate from its mating ball joint 238, as indicated.

The proximal end of hose 242 in this embodiment is simply positioned by a friction fit in T-junction 204 (i.e., it has no splayed end 244 as shown in FIG. 11) so it may come out if this joint separates, whereupon the mirror will fall to the fall of the shower. If the distal end separates, the hose usually will hold the mirror from falling due to its captivation by T-intersection 250' (FIG. 18B).

SUMMARY, RAMIFICATIONS, AND SCOPE

The reader will thus see that I have provided a shower mirror which will not fog, which can be easily adjusted to any position, which will snap apart in case of trauma, which has a provision to release water in case of excess pressure, which has a hose whose spray apertures will always point in the proper direction, which provides a magnifying mirror without the attendant expense of specially molding in magnifying mirror, and which is relatively rigid.

While several specific embodiments have been shown, other variations in the spray nozzle construction and location, the formation of boundaries for the heat transfer compartment, and the drainage of the water away from the bottom of the space behind the mirror can be made to provide equivalent structures. There will be other changes, modifications and substitutions which will be evident to those skilled in the art and which are considered to be within the scope of the present invention, as set forth in the appended claims. Therefore the scope of the invention should be determined by the appended claims and their legal equivalents, and not by the examples given.

I claim:

1. A mirror assembly for use in a shower enclosure having a water-dispensing showerhead assembly including a showerhead and a supply pipe therefor, comprising:
    a mirror having a reflecting front surface, a rear surface
    facing in the opposite direction from said front surface, and an edge connecting said front and rear surfaces,
    a frame surrounding said edge of said mirror, said frame also extending behind and in parallel to said rear surface of said mirror so as to provide an enclosed space behind said rear surface of said mirror, said frame having an outlet so that water present in said enclosed space can flow out of said enclosed space;
    an elongated flexible arm;
        said arm having an elongated lumen extending therethrough,
        a distal end of said arm being attached to said frame so as to support said mirror,
        a proximal end of said arm, opposite said distal end thereof, having attachment means for attaching said arm to said showerhead assembly and diverting a portion of the water flowing to said showerhead through said lumen and to said enclosed space behind said mirror,
        the space within said lumen communicating with said enclosed space behind said mirror such that fluid present in said lumen can flow into said enclosed space behind said mirror,
        said arm comprising a plurality of individual ball-andsocket friction joints which enable said arm to be flexible and bendable,
        said joints being sufficiently small and numerous so that when said proximal end of said arm is attached to said showerhead assembly, and said arm extends linearly outwardly from said showerhead assembly with said frame attached to said distal end thereof such that said mirror occupies an initial position, said arm can be manually bent on its joints in any direction so that mirror can be manually moved to any position within a given range around said initial position and toward said showerhead assembly, and remains in any stable position, without changing the angular orientation of said mirror with respect to said showerhead.

2. The mirror assembly of claim 1, further including a flexible inner tube positioned in said lumen, said flexible inner tube communicating with said showerhead supply pipe and said space behind said mirror.

3. The mirror assembly of claim 1 wherein said individual ball-and-socket friction joints are uniform in length.

4. The mirror assembly of claim 1 wherein said mirror and said frame therefor are circular in shape, said frame having an annnular portion with a circular outer edge, said distal end of said arm being connected to said outer edge.

5. The mirror assembly of claim 4 wherein said frame also includes a circular back plate which is parallel to and spaced from said rear surface of said mirror to define said enclosed space behind said mirror.

6. The mirror assembly of claim 1 wherein said joints are separable so that said arm can separate in case of trauma thereto.

7. A mirror assembly for use in a shower, comprising:
    a mirror having a front reflecting face and a back surface;
    a frame for holding said mirror; said frame including a temperature-control space adjacent said back surface of said mirror;
    an arm having a proximal end attached to a showerhead assembly and a distal end attached to said frame for supporting said frame and said mirror away from a shower wall;

said arm being hollow and comprising a plurality of individual ball-and-socket friction joint means which enable said arm to be flexible and bendable, said joint means being sufficiently small and numerous so that when said proximal end of said arm is attached to said showerhead assembly, and said arm extends linearly outward from said showerhead assembly with said frame attached to said distal end thereof such that said mirror occupies an initial position, said arm can be manually bent on said joint means in any direction so that mirror can be manually moved to any position within a given range around said initial position and toward said showerhead assembly, and remains stable in any position, without changing the angular orientation of said mirror with respect to said showerhead, and mounting means at a proximal end of said arm for holding said arm so as to suspend said frame and said mirror at said distal end of said arm above a shower floor.

8. The mirror assembly of claim 7, further including a flexible inner tube having a space therein, and means connecting said tube from a heated water supply to saidi temperature control space, said tube being positioned within the hollow space of said arm, said space in said inner tube communicating with both the space within said showerhead supply pipe and said temperature-control space behind said mirror, such that water in said pipe can flow from said pipe through said space in said inner tube and to said temperature-control space behind said mirror.

9. The mirror assembly of claim 7 wherein at least one joint of said arm is separable for allowing said arm to separate in case of trauma thereto.

10. The mirror assembly of claim 7 wherein at least one joint of said arm is a rotary joint which can be pivoted so that the front reflecting face of said mirror can be turned toward said wall during non-use.

11. The mirror assembly of claim 7 wherein said mounting means comprises a T-connection which is arranged to attach said distal end of said arm to a showerhead pipe.

12. The mirror assembly of claim 7 wherein said mirror and said frame are circular.

13. The mirror assembly of claim 7, further including a back plate attached on the rear of said frame for at least partially enclosing said temperature control space.

14. The mirror assembly of claim 13 wherein said mirror has a circular shape, said frame comprises a circular flange surrounding said mirror and extending to the rear of said mirror to partially surround said temperature control space, said back plate being positioned within said frame behind said mirror to partially enclose said temperature control space in cooperation with said frame.

15. The mirror assembly of claim 7, further including drain means at the lower end of said temperature control space for allowing gravity flow of water away from said temperature control space.

16. The mirror assembly of claim 7 wherein said frame includes a flange overlying the peripheral portion of the front reflecting face of said mirror.

17. The mirror assembly of claim 16, further including a back plate at least partially enclosing said temperature control space.

18. The mirror assembly of claim 16 wherein said ball and socket joints are separable so that said arm will separate in case of trauma to said mirror.

* * * * *